(12) United States Patent
Kurien et al.

(10) Patent No.: US 9,311,483 B2
(45) Date of Patent: *Apr. 12, 2016

(54) LOCAL SECURE SERVICE PARTITIONS FOR OPERATING SYSTEM SECURITY

(71) Applicant: Microsoft Technology Licensing, LLC, Redmond, WA (US)

(72) Inventors: Thekkthalackal Varugis Kurien, Sammamish, WA (US); Paul England, Bellevue, WA (US); Ravindra Nath Pandya, Clyde Hill, WA (US); Niels Ferguson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/068,996

(22) Filed: Oct. 31, 2013

(65) Prior Publication Data

US 2014/0059680 A1 Feb. 27, 2014

Related U.S. Application Data

(63) Continuation of application No. 11/097,697, filed on Apr. 1, 2005, now Pat. No. 8,619,971.

(51) Int. Cl.
*G06F 11/00* (2006.01)
*G06F 12/14* (2006.01)
(Continued)

(52) U.S. Cl.
CPC .............. *G06F 21/57* (2013.01); *G06F 9/5077* (2013.01); *G06F 2221/2149* (2013.01)

(58) Field of Classification Search
CPC .................... G06F 21/57; G06F 2221/2149

USPC ........................................................... 726/22
See application file for complete search history.

(56) References Cited

U.S. PATENT DOCUMENTS 5,564,040 A    10/1996   Kubala
6,289,462 B1    9/2001   McNabb et al.
(Continued)

FOREIGN PATENT DOCUMENTS

CA           2245976 A1    2/2000
WO      WO 02/03208 A2    1/2002

OTHER PUBLICATIONS

T Boden; The Grid Enterprise—Structuring the Agile Business of the Future; Wednesday, Nov. 3, 2004; vol. 22, No. 1 / Jan. 2004; pp. 107-117.

(Continued)

*Primary Examiner* — Monjour Rahim
(74) *Attorney, Agent, or Firm* — Timothy Churna; Kate Drakos; Micky Minhas

(57) ABSTRACT

Systems and methods provide multiple partitions hosted on an isolation technology such as a hypervisor where at least one of the partitions, a local secure service partition (LSSP), provides security services to other partitions. The service partitions (LSSPs) host those high assurance services that require strict security isolation, where the service can be shared across partitions and accessed even when the user is not connected to a network. The LSSP also can certify the results of any computation using a key signed by a TPM attestation identity key (AIK), or other key held securely by the hypervisor or a service partition. The LSSPs may be configured to provide trusted audit logs, trusted security scans, trusted cryptographic services, trusted compilation and testing, trusted logon services, and the like.

22 Claims, 7 Drawing Sheets

(51) Int. Cl.
*G06F 12/16* (2006.01)
*G08B 23/00* (2006.01)
*G06F 21/57* (2013.01)
*G06F 9/50* (2006.01)

(56) References Cited

U.S. PATENT DOCUMENTS

| | | | |
|---|---|---|---|
| 6,360,945 B1 | 3/2002 | Drew | |
| 6,775,779 B1 | 8/2004 | England et al. | |
| 6,880,002 B2 | 4/2005 | Hirschfeld et al. | |
| 6,986,052 B1* | 1/2006 | Mittal | 713/190 |
| 2002/0129274 A1* | 9/2002 | Baskey et al. | 713/201 |
| 2002/0194389 A1* | 12/2002 | Worley et al. | 709/310 |
| 2003/0018892 A1 | 1/2003 | Tello | |
| 2003/0023867 A1 | 1/2003 | Thibadeau | |
| 2003/0101322 A1 | 5/2003 | Gardner | |
| 2005/0033980 A1 | 2/2005 | Willman et al. | |
| 2006/0020781 A1 | 1/2006 | Scarlata et al. | |
| 2006/0136910 A1 | 6/2006 | Brickell et al. | |
| 2006/0184349 A1 | 8/2006 | Goud et al. | |

OTHER PUBLICATIONS

"Microkernel-based OS Efforts", Christopher Browne's Web Pages, http://www.cbbrowne.com/info/microkernel.html, Mar. 25, 2005, 7 pages.

"Security Policy Abstractions", http://www.nsa.gov/selinux/info/policy.cfm, Mar. 25, 2005, 1 page. cited by applicant.

Department of Computer Science, J.N. Herder@ cs.vu.nl, Microkernels//Operating Systems, www.cs.vu.nl/.about.jnherder/microkernels/presentation-slides-full.pdf, Mar. 25, 2005, 4 pages.

* cited by examiner

LOCAL SECURE SERVICE PARTITIONS FOR OPERATING SYSTEM SECURITY

CROSS REFERENCE TO RELATED APPLICATIONS

This application is a continuation of U.S. patent application Ser. No. 11/097,697 filed Apr. 1, 2005, which is hereby incorporated by reference in its entirety.

TECHNICAL FIELD

The invention is directed to systems and methods for providing security and other services to operating systems in a virtual machine (VM) environment and, more particularly, the invention is directed to systems and methods of placing specific operating system modules into different isolated environments such that these modules may provide services to one or more largely unmodified operating systems in a VM environment.

BACKGROUND

Computer users are increasingly concerned about the security and availability threats posed by viruses, worms, Trojan horses, identity theft, software and media content piracy, and extortion using threats of data destruction. Conventional operating systems provide numerous security features to guard against such attacks such as checking and enforcing the rights of user or program subjects by the system trusted computing base (TCB). However, the TCBs of modern operating system suffer from various problems, such as:
  1. Critical TCB components are not isolated from modification by attacking code. For example, an attacking driver can affect the security auditing function or the decisions made by the system security reference monitor. Consequently, it is necessary to provide sufficient isolation for important TCB components such that their behavior cannot be easily controverted.
  2. The state of critical TCB components cannot be adequately "measured" in order to understand if they are "good".

Computer security is often dependent on being able to predict the behavior of software components. In general, the security of a system may flow from the premise that a known program whose behavior is understood, which proceeds from a known good state, will act in a predictable manner (i.e., that its output is what it should be). Conversely, the thwarting of security—which may involve getting a computer system to behave in ways that are outside the contemplation of its designer—can generally be realized by replacing or changing a known program, or running it in a state in which its behavior is not understood. Thus, one aspect of providing security for a computing environment includes verifying that a known program is being used, and that it is proceeding from a known good state. The TPM accomplishes this by validating that data is what it should be because a measurement such as a hash of the data matches a value previously sealed in the TPM.

Most TPMs today conform to the TRUSTED COMPUTING GROUP® (TCG) standard, presently available at https://www.trustedcomputinggroup.org/home and entitled "Trusted Platform Module (TPM) Specification Version 1.2." The TPM is a subsystem that may be incorporated into computing platforms to establish trust for the code that is executed by a platform. Standardization of mechanisms for establishing trustworthy code is beneficial because it allows the security and cryptographic community to assess the mechanisms for providing security, and because it promotes customer understanding and trust of new software features. It also encourages innovation in implementing and improving the standard, as contemplated and encouraged by the TCG®.

Modern computer systems that contain TPMs typically have large monolithic trusted computing bases (TCBs) with complicated interfaces. Unfortunately, the complexity of the interfaces may result in breaches of the TCB. To minimize such breaches, it is known that certain modules inside the TCB may be run in a higher assurance level than the operating system. Thus, one prior art approach is to build a very small microkernel that is secure, and then to run service processes for the security services (or place them in the microkernel). This has been done in previous operating systems, such as Mach, but it is difficult to retrofit this sort of behavior to an existing operating system.

Existing operating systems may also provide security by using a boot procedure to audit the identification of the user and to provide a meaningful identification to the operating system's software stack so that the operating system may be examined before booting for proper authentication. Hashing may also be used to provide an attestation service to each program in an operational chain. Unfortunately, the operational software chain may not be dynamically recreated. It is desired to recreate the chain dynamically on each request using secure attestation software such as software that has been authenticated and used by the service partition.

Another approach to minimizing operating system breaches is to provide an isolation technology such as a virtual machine (VM) that isolates an operating system in a secure partition within the VM environment. However, operating systems within a VM environment are only as secure as their interfaces and security features allow them to be.

A solution is desired that allows service processes to be placed at a higher assurance level by checking the integrity of a TCB service module and the environment that it operates in and by providing sufficient isolation for the service process to execute unmolested, while simultaneously limiting access to the service modules to trusted system components. A solution is also desired that may be retrofitted to existing operating systems. The invention provides such solutions.

SUMMARY

The invention provides solutions to the security problems mentioned above by providing an isolation kernel or hypervisor running beneath the operating system and moving specific service modules into different isolated partitions in the VM environment. The isolated service modules may then provide services to one or more operating systems in the VM environment that are unmodified except to the extent that they are modified to support inter-partition service calls to services that have been moved to the isolated partitions (remoted). In accordance with the invention, such a design approach requires relatively simple changes to existing operating systems as well as a reduction in the size of the trusted computing base (a hypervisor or hypervisor subset), resulting in relatively high assurance.

The invention provides multiple partitions hosted on an isolation technology such as a hypervisor where at least one of the partitions, referred to herein as a local secure service partition (LSSP), provides security services to other partitions. The service partitions (LSSPs) host those services that require strict security isolation, where the service can be shared across partitions. To provide strict assurance, the LSSP certifies the result of a computation by signing with a key slaved off the TPM attestation identity key (AIK) and disclosed by the TPM to a partition whose integrity has been measured by the TPM or a trusted hypervisor. The LSSPs in accordance with the invention may be configured to provide trusted audit logs, trusted security scans, trusted cryptographic services, trusted compilation and testing, trusted logon services, and the like.

The invention also includes a computer readable medium including software that performs the methods of the invention when read by a suitable host computer system. Also, it will be appreciated by those skilled in the art that multiple LSSPs, each with its own responsibilities, may be used in accordance with the invention. Also, it will be appreciated that such LSSPs may be used as secure containers for running little parts of the operating system that it is desired to secure from other parts of the operating system. Also, while a TPM provides additional security, a TPM is not necessary to implementation of the invention so long as the integrity of the system is otherwise assured. Additional characteristics of the invention will be apparent to those skilled in the art based on the following detailed description.

BRIEF DESCRIPTION OF THE DRAWINGS

The systems and methods for implementing local secure service partitions (LSSPs) that provide security services to other partitions in accordance with the invention are further described with reference to the accompanying drawings, in which.

DETAILED DESCRIPTION OF ILLUSTRATIVE EMBODIMENTS

Overview

Figure 1A:
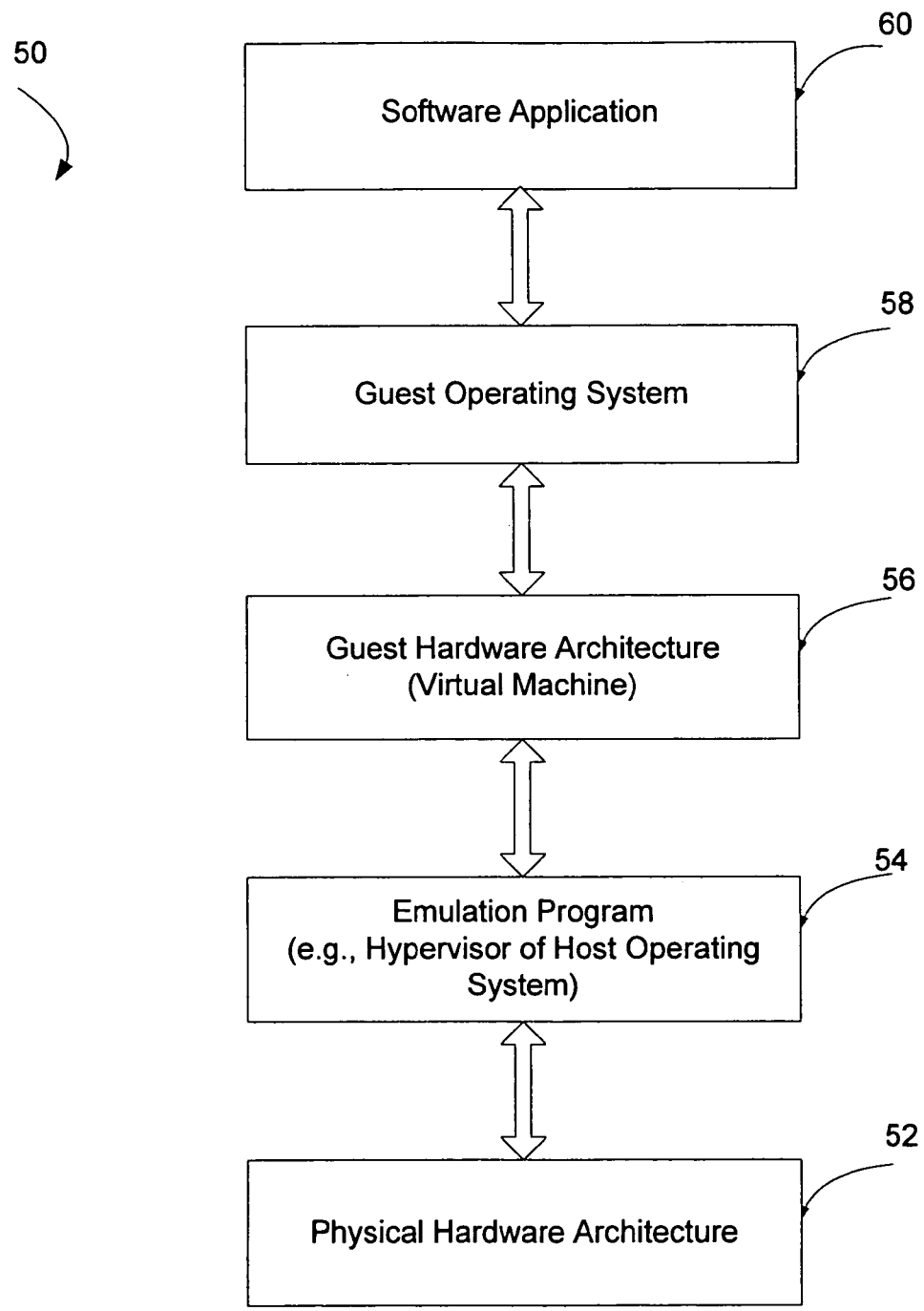
FIG. 1A is a block diagram representing the logical layering of the hardware and software architecture for an emulated operating environment in a computer system.

The invention provides systems and methods for providing multiple partitions hosted on an isolation technology such as a hypervisor where at least one of the partitions, referred to herein as a local secure service partition (LSSP), provides security services to other partitions. The service partitions (LSSPs) host those high assurance services that require strict security isolation, where the service can be shared across partitions and accessed even when the user is not connected to a network. To provide high assurance, the LSSP also can certify the results of any computation using a key signed by a TPM attestation identity key (AIK) and disclosed by the TPM to a partition whose integrity has been measured by the TPM or a trusted hypervisor. The LSSPs in accordance with the invention may be configured to provide trusted audit logs, trusted security scans, trusted cryptographic services, trusted compilation and testing, trusted logon services, and the like. Also, multiple LSSPs, each with its own responsibilities, may be used in accordance with the invention. Such LSSPs may be used as secure containers for running little parts of the operating system that it is desired to secure from other parts of the operating system.

Other more detailed aspects of the invention are described below, but first, the following description provides a general overview of and some common vocabulary for virtual machines and associated terminology as the terms have come to be known in connection with operating systems and the host processor ("CPU") virtualization techniques. In doing so, a set of vocabulary is set forth that one of ordinary skill in the art may find useful for the description that follows of the apparatus, systems and methods for determining network optimizations in a VM network and combining network objects to provide such optimizations in accordance with the invention.

Overview of Virtual Machines

Computers include general purpose central processing units (CPUs) or "processors" that are designed to execute a specific set of system instructions. A group of processors that have similar architecture or design specifications may be considered to be members of the same processor family. Examples of current processor families include the Motorola 680X0 processor family, manufactured by International Business Machines (IBM) or Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format, while the Motorola PowerPC instruction set is based on the Reduced Instruction Set Computer (RISC) format. CISC processors use a large number of instructions, some of which can perform rather complicated functions, but which generally require many clock cycles to execute. RISC processors, on the other hand, use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

Generally speaking, computer manufacturers try to maximize their market share by having more rather than fewer applications run on the microprocessor family associated with the computer manufacturers' product line. To expand the number of operating systems and application programs that can run on a computer system, a field of technology has developed in which a given computer having one type of CPU, called a host, will include a virtualizer program that allows the host computer to emulate the instructions of an unrelated type of CPU, called a guest. Thus, the host computer will execute an application that will cause one or more host instructions to be called in response to a given guest instruction, and in this way the host computer can both run software designed for its own hardware architecture and software written for computers having an unrelated hardware architecture.

As a more specific example, a computer system manufactured by Apple Computer, for example, may run operating systems and programs written for PC-based computer systems. It may also be possible to use virtualizer programs to execute concurrently on a single CPU multiple incompatible operating systems. In this latter arrangement, although each operating system is incompatible with the other, virtualizer programs can host each of the several operating systems and thereby allowing the otherwise incompatible operating systems to run concurrently on the same host computer system.

When a guest computer system is emulated on a host computer system, the guest computer system is said to be a "virtual machine" as the guest computer system only exists in the host computer system as a pure software representation of the operation of one specific hardware architecture. Thus, an operating system running inside virtual machine software such as Microsoft's Virtual PC may be referred to as a "guest" and/or a "virtual machine," while the operating system running the virtual machine software may be referred to as the "host." The terms virtualizer, emulator, direct-executor, virtual machine, and processor emulation are sometimes used interchangeably to denote the ability to mimic or emulate the hardware architecture of an entire computer system using one or several approaches known and appreciated by those of skill in the art. Moreover, all uses of the term "emulation" in any form is intended to convey this broad meaning and is not intended to distinguish between instruction execution concepts of emulation versus direct-execution of operating system instructions in the virtual machine. Thus, for example, Virtual PC software available from Microsoft Corporation "emulates" (by instruction execution emulation and/or direct execution) an entire computer that includes an Intel 80X86 Pentium processor and various motherboard components and cards, and the operation of these components is "emulated" in the virtual machine that is being run on the host machine. A virtualizer program executing on the operating system software and hardware architecture of the host computer, such as a computer system having a PowerPC processor, mimics the operation of the entire guest computer system.

The general case of virtualization allows one processor architecture to run OSes and programs from other processor architectures (e.g., PowerPC Mac programs on x86 Windows, and vice versa), but an important special case is when the underlying processor architectures are the same (run various versions of x86 Linux or different versions of x86 Windows on x86). In this latter case, there is the potential to execute the Guest OS and its applications more efficiently since the underlying instruction set is the same. In such a case, the guest instructions are allowed to execute directly on the processor without losing control or leaving the system open to attack (i.e., the Guest OS is sandboxed). This is where the separation of privileged versus non-privileged and the techniques for controlling access to memory comes into play. For virtualization where there is an architectural mismatch (PowerPC <-> x86), two approaches could be used: instruction-by-instruction emulation (relatively slow) or translation from the guest instruction set to the native instruction set (more efficient, but uses the translation step). If instruction emulation is used, then it is relatively easy to make the environment robust; however, if translation is used, then it maps back to the special case where the processor architectures are the same.

In accordance with the invention, the guest operating systems are virtualized and thus an exemplary scenario in accordance with the invention would be emulation of a Windows95®, Windows98®, Windows 3.1, or Windows NT 4.0 operating system on a Virtual Server available from Microsoft Corporation. In various embodiments, the invention thus describes systems and methods for controlling guest access to some or all of the underlying physical resources (memory, devices, etc.) of the host computer.

The virtualizer program acts as the interchange between the hardware architecture of the host machine and the instructions transmitted by the software (e.g., operating systems, applications, etc.) running within the emulated environment. This virtualizer program may be a host operating system (HOS), which is an operating system running directly on the physical computer hardware (and which may comprise a hypervisor). Alternately, the emulated environment might also be a virtual machine monitor (VMM) which is a software layer that runs directly above the hardware, perhaps running side-by-side and working in conjunction with the host operating system, and which can virtualize all the resources of the host machine (as well as certain virtual resources) by exposing interfaces that are the same as the hardware the VMM is virtualizing. This virtualization enables the virtualizer (as well as the host computer system itself) to go unnoticed by operating system layers running above it.

Processor emulation thus enables a guest operating system to execute on a virtual machine created by a virtualizer running on a host computer system comprising both physical hardware and a host operating system.

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that the software layers are running on their own private computer system, and thus VMs can allow multiple "guest systems" to run concurrently on a single "host system." This level of abstraction is represented by the illustration of FIG. 1A.

FIG. 1A is a diagram representing the logical layering of the hardware and software architecture for an emulated operating environment in a computer system. In the figure, an emulation program 54 runs directly or indirectly on the physical hardware architecture 52. Emulation program 54 may be (a) a virtual machine monitor that runs alongside a host operating system, (b) a specialized host operating system having native emulation capabilities, or (c) a host operating system with a hypervisor component wherein the hypervisor component performs the emulation. Emulation program 54 emulates a guest hardware architecture 56 (shown as broken lines to illustrate the fact that this component is the "virtual machine," that is, hardware that does not actually exist but is instead emulated by said emulation program 54). A guest operating system 58 executes on the guest hardware architecture 56, and software application 60 runs on the guest operating system 58. In the emulated operating environment of FIG. 1A—and because of the operation of emulation program 54—software application 60 may run in computer system 50 even if software application 60 is designed to run on an operating system that is generally incompatible with the host operating system and hardware architecture 52.

Figure 1B:
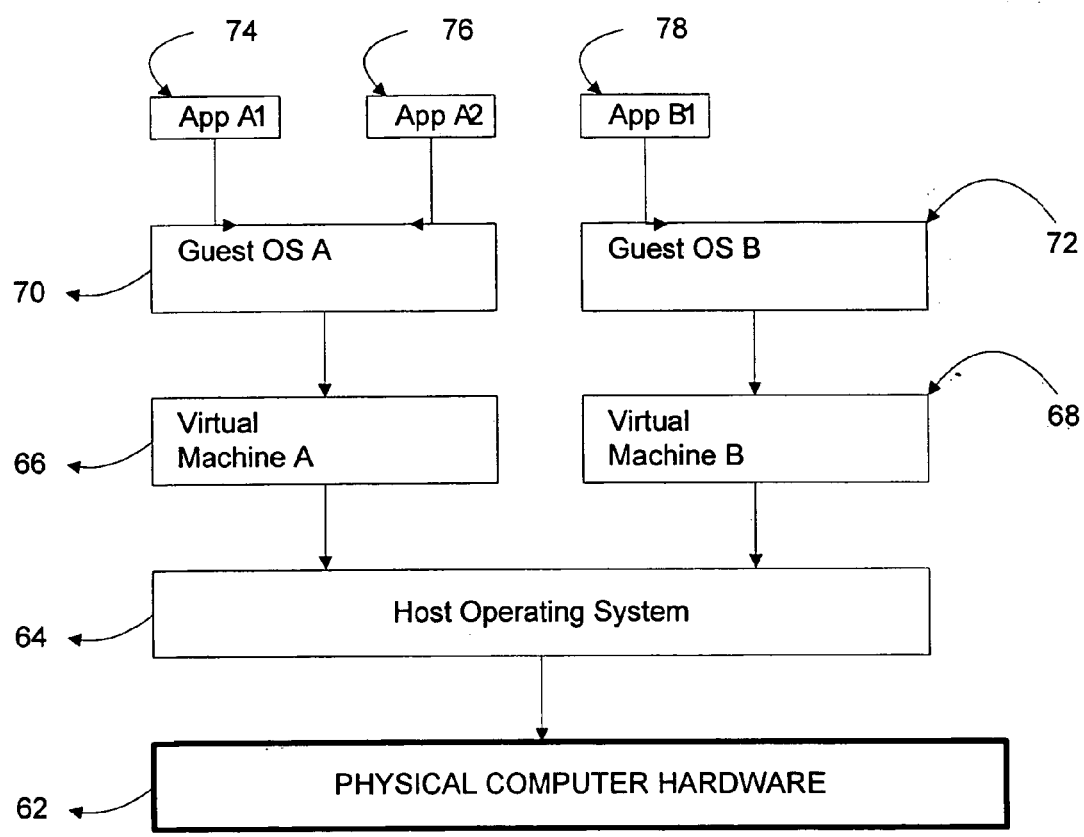
FIG. 1B is a block diagram representing a virtualized computing system wherein the emulation is performed by the host operating system (either directly or via a hypervisor)

FIG. 1B illustrates a virtualized computing system comprising a host operating system software layer 64 running directly above physical computer hardware 62 where the host operating system (host OS) 64 provides access to the resources of the physical computer hardware 62 by exposing interfaces that are the same as the hardware the host OS is emulating (or "virtualizing")—which, in turn, enables the host OS 64 to go unnoticed by operating system layers running above it. Again, to perform the emulation the host OS 64 may be a specially designed operating system with native emulations capabilities or, alternately, it may be a standard operating system with an incorporated hypervisor component for performing the emulation (not shown).

As shown in FIG. 1B, above the host OS 64 are two virtual machine (VM) implementations, VM A 66, which may be, for example, a virtualized Intel 386 processor, and VM B 68, which may be, for example, a virtualized version of one of the Motorola 680X0 family of processors. Above each VM 66 and 68 are guest operating systems (guest OSes) A 70 and B 72 respectively. Running above guest OS A 70 are two applications, application A1 74 and application A2 76, and running above guest OS B 72 is application B1 78.

In regard to FIG. 1B, it is important to note that VM A 66 and VM B 68 (which are shown in broken lines) are virtualized computer hardware representations that exist only as software constructs and which are made possible due to the execution of specialized emulation software(s) that not only presents VM A 66 and VM B 68 to Guest OS A 70 and Guest OS B 72 respectively, but which also performs all of the software steps necessary for Guest OS A 70 and Guest OS B 72 to indirectly interact with the real physical computer hardware 62.

Figure 1C:
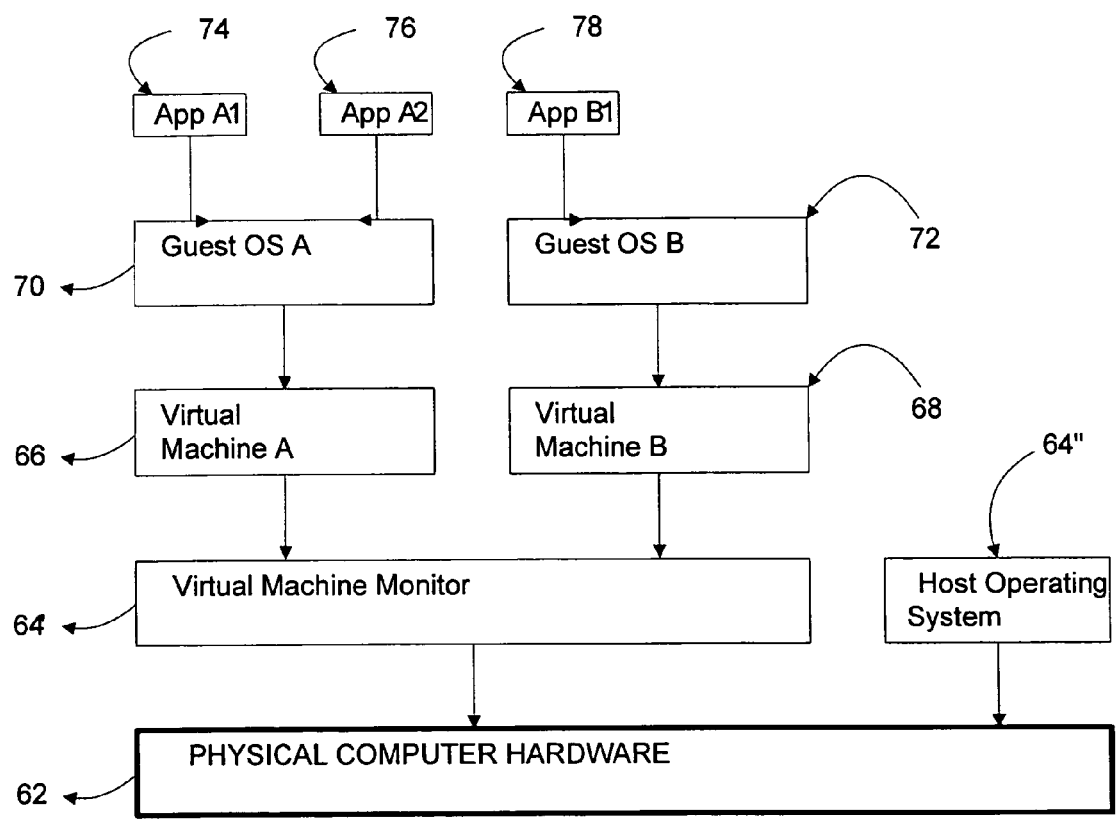
FIG. 1C is a block diagram representing an alternative virtualized computing system wherein the emulation is performed by a virtual machine monitor running side-by-side with a host operating system.

FIG. 1C illustrates an alternative virtualized computing system wherein the emulation is performed by a virtual machine monitor (VMM) 64' running alongside the host operating system 64". For certain embodiments the VMM 64' may be an application running above the host operating system 64" and interacting with the physical computer hardware 62 only through the host operating system 64". In other embodiments, and as shown in FIG. 1C, the VMM 64' may instead comprise a partially independent software system that on some levels interacts indirectly with the computer hardware 62 via the host operating system 64" but on other levels the VMM 64' interacts directly with the computer hardware 62 (similar to the way the host operating system interacts directly with the computer hardware). And in yet other embodiments, the VMM 64' may comprise a fully independent software system that on all levels interacts directly with the computer hardware 62 (similar to the way the host operating system 64" interacts directly with the computer hardware 62) without utilizing the host operating system 64" (although still interacting with said host operating system 64" insofar as coordinating use of the computer hardware 62 and avoiding conflicts and the like).

All of these variations for implementing the virtual machine are anticipated to form alternative embodiments of the invention as described herein, and nothing herein should be interpreted as limiting the invention to any particular emulation embodiment. In addition, any reference to interaction between applications 74, 76, and 78 via VM A 66 and/or VM B 68 respectively (presumably in a hardware emulation scenario) should be interpreted to be in fact an interaction between the applications 74, 76, and 78 and the virtualizer that has created the virtualization. Likewise, any reference to interaction between applications VM A 66 and/or VM B 68 with the host operating system 64 and/or the computer hardware 62 (presumably to execute computer instructions directly or indirectly on the computer hardware 62) should be interpreted to be in fact an interaction between the virtualizer that has created the virtualization and the host operating system 64 and/or the computer hardware 62 as appropriate.

Local Secure Service Partitions

Figure 2:
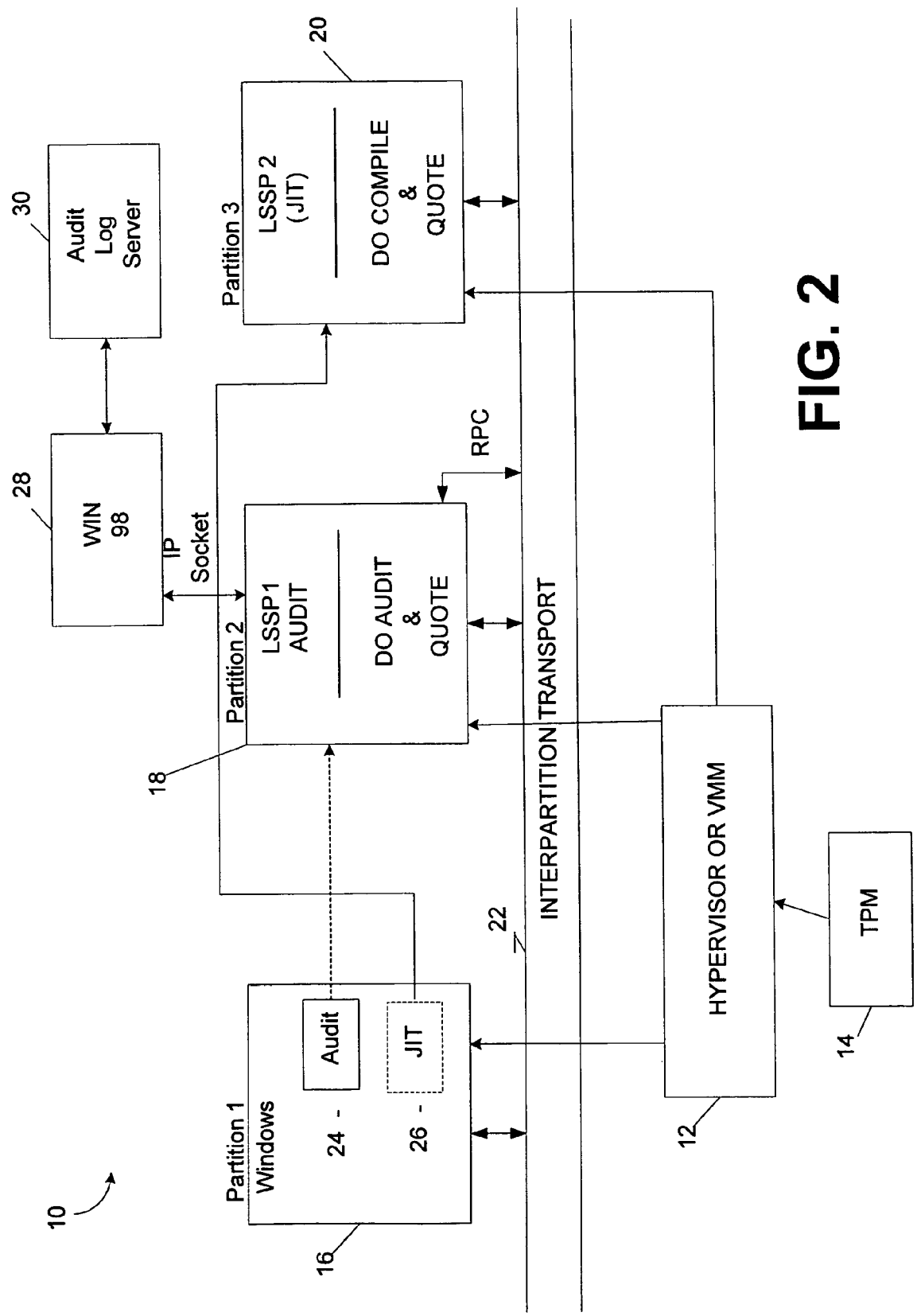
FIG. 2 illustrates the implementation of local secure service providers (LSSPs) in a VM environment in accordance with the invention.

The invention implements microkernel functionality in a VM context to provide process isolation for operating systems services, such as security, that may be separated from other operating system services and provided in a separate VM partition. FIG. 2 illustrates an exemplary embodiment of the invention.

As illustrated in FIG. 2, a process isolated audit log service and a trusted compilation and test service may be separated from the operating system and placed in a higher security partition that may only be accessed by authorized operating systems in other partitions. In particular, the computing environment 10 of the invention is implemented in a trusted computing environment executing on a hypervisor or virtual machine module (VMM) 12 using known VM techniques. The hypervisor or VMM 12 may be monitored by a trusted program module (TPM) 14 that includes a register containing a program identification for the hypervisor or VMM 12. In accordance with the invention, the VMM may authenticate the service partitions by any means, for example, TPM measurements are extended to each partition operating in the VM environment whereby each partition has its own program identification to enable secure monitoring. In accordance with the invention, security services normally provided by the hypervisor or VMM 12 or the respective operating systems are moved to respective partitions. In the illustrated example, a first VM partition 16 includes a virtualized Windows operating system, a second VM partition 18 includes the audit services moved from the hypervisor or VMM 12 in accordance with the invention, and a third VM partition 20 includes compilation services moved from the hypervisor or VMM 12 or operating system in accordance with the invention. Each of these partitions is implemented in a secure fashion on hypervisor or VMM 12 using techniques described in more detail below. As illustrated, partitions 16, 18, and 20 communicate with each other via an interpartition transport 22.

In the exemplary embodiment, the Windows operating system in the first partition 16 is modified such that standard audit software 24 and just-in-time (JIT) compiler 26 is "remoted" to respective partitions 18 and 20 as illustrated. In accordance with the invention, these services are not performed in the partition 16 by the Windows operating system or by the hypervisor or VMM 12 but are instead performed in respective partitions 18 and 20 as illustrated. In particular, the audit software 24 is modified to call an audit log service in partition 18 using a partition ID provided by hypervisor or VMM 12 from TPM 14. By moving the audit log service into partition 18 and isolating the audit log service from the Windows operating system in partition 16 in this fashion, the audit log may be kept more secure to prevent improper access to the audit log to hide improper system access. As illustrated, the audit log service in partition 18 may perform an audit and quote and provide the quote to a new operating system via a remote procedure call, or the quote may be provided via an IP socket to an incumbent operating system 28, such as Windows 98, and its associated audit log server 30.

Similarly, the JIT compiler 26 may be modified to call a compile service in partition 20 using a partition ID provided by the hypervisor or VMM 12 from TPM 14. As illustrated, the JIT compiler 26 may be moved to partition 20 where the JIT compiler 26 certifies the input parameters that it took (the CLR assembly and manifest) and generates a signature over the JITted code that it generated using the input. The signing key is the signing key for the JIT compiler 26, which is held in TPM sealed storage. To provide increased assurance, the digital signature may no longer be valid after the JIT compilation. In this case, the JIT in the partition 20 may provide its compiler log to the hypervisor or VMM 12 with a request that the compilation result be certified with a quote function. The JIT in the partition 20 could provide a chain of evidence, trusted or not, in response to external requests (i.e., requests from the Windows operating system in partition 16.

Exemplary embodiments of LSSPs in accordance with the invention will now be described with reference to FIG. 3, which illustrates a sample configuration of a VM system based on hypervisor 12. The Windows OS 16, audit LSSP 18, compile LSSP 20, and Windows98 OS 28 from FIG. 2 are implemented in respective partitions as illustrated, and an additional LSSP is implemented in partition 34 while additional operating systems are implemented in respective partitions 36 and 38.

Example 1

Protected Audit Logs

Adversaries that attack operating systems often modify the audit log (typically hosted in the partition of the operating system) for the purpose of covering their tracks. The present invention prevents such modifications of the audit log by enabling any partition hosting an operating system to do an un-buffered write of the audit records to an audit log server in the audit LSSP 18. The hypervisor system 12 is assumed to support enough policy to ensure that no partition other than a partition in the trusted computing base of the system (such as audit LSSP 18) has any rights to the audit logs generated by the audit log server in the audit LSSP 18. Since the TCB of a service partition has been aggressively minimized in accordance with the invention, and the adversary cannot affect the state of the audit log due to the system policy implemented by the TPM 14, this protected audit log can be used as input into intrusion detection and computer forensic systems. Furthermore, in systems in which TPM 14 contains a hardware based monotonic counter, the counter may be virtualized or para-virtualized to provide a protected log-sequence number (LSN) for the audit service. Generally, for such a system to be secure, it is necessary that TPM resources such as the CPU, inter-partition communications transport 22 and disk be made available by an availability providing base controlled by the TCB.

The audit log implemented in audit LSSP 18 may be written to by the operating system being serviced in the same fashion as though the operating system were writing to a remote server. Remote Procedure Calls (RPCs) may be executed on the remote partition calling the audit LSSP 18. A stub pair may be sent to the audit LSSP 18 for execution. Redirection may be implemented by installing an execution file (.exe) or executing a .dll file using known techniques. In such an embodiment, the audit log may be sent to a remote administrator who changes the remote server address to that of the audit LSSP 18 for execution. In the embodiment of FIG. 3, the NT server 38 may be configured as an audit server that provides a remote audit service (RAS) to other partitions. In other words, the NT server 38 collects audit logs from other partitions and maintains these audit logs in a separate secure partition. As just noted, the RAS may be accessed via a redirected send or via a RPC.

Example 2

Security Scans of Partitions

In the case when a partition boots off a secure (integrity protected and optionally encrypted) virtual block device ("SVBD"), the Message Authentication Code (MAC) and encryption keys of the SVBD are held by the system TCB. A (trusted) service partition can examine the virtual hard disk for cleanliness (integrity of system components and being free from malware) and can also check other aspects of a partition that may not be reliably reported by the OS itself— for instance, the OS version, patch level, virus checker in use, current virus definition file in use, anti-spyware, and other things that could be done in process but for which the reporting reliability depends upon the guest not having already been affected by malware. The trusted service partition can read only or read/write mount the SVBD between boot instantiations and check the "cleanliness" of the disk by validating hashes of critical system components, running anti-virus or spyware checkers, checking to see if appropriate security patches have been applied, and the like. In other words, a process in "scan" partition 34 may check for modifications in boot files of other processes (read only) in other partitions prior to booting to thus function as a system integrity checker. The scan partition 34 thus serves as a home for integrity check tools to avoid rebooting the entire platform. In this fashion, the scan partition 34 functions like a virtual boot CD to boot processes in the other partitions. The scan partition 34 includes the above-mentioned software for virus checking, scanning and cleaning a process before boot. The scan partition 34 may also include certification software and post-boot virus checking software to provide security services after the software is booted.

Those skilled in the art will appreciate that this is much better than systems performing self-verification, since an adversary may have already loaded a disk driver that provides misleading assurances of the cleanliness of system components. This scan will not even be affected by attacks made by the administrator of a scanned partition. Finally, if a driver load is remoted to an LSSP, such as scan partition 34, aided by the hypervisor 12, the invention provides some assurance that at least the first attacking driver loaded by the administrator in the target partition will be audited. However, subsequent loads of drivers cannot be validated since the (attacking) administrator may not use a standard interface to get attacking code running in the kernel. In this sense, the invention provides an improvement over technologies such as Secure Boot to Arbaugh et al. or Cornerstone.

Based on a test of "cleanliness", the scan LSSP 34, in tandem with the system TCB, may create and enforce an exception state for the scanned boot disk, which may include, though is not limited to, refusing to boot the affected disk, entering a recovery state for the affected disk, granting (or not granting) access to network resources based on the state of the machine) and the like. More generally, the scan LSSP 34 hosts an evaluator, Bool Verifier([in] disk_name) that "verifies" the boot disk. If the function Verifier( ) returns TRUE, the bootable SVBD is in an exception condition. It will be appreciated that Verifier( ) does not have to just deal with bootable disks, any mass storage device can be made a target of Verifier( ).

Example 3

Crypto Services and Storage of Root Certificate Keys

When high levels of confidentiality are desired, root certificate keys for refactoring of partitions may be held in a store managed by a LSSP, such as scan LSSP 34, to protect against a root key attack. Ordinary (non-service) partitions, such as a partition 36 including a Windows operating system, do not have rights to the root certificate keys and cannot simply replace the root keys by a compromised key. The cryptographic services are thus placed in isolated scan partition 34 and may be accessed using a Windows flag or other operating system flag rather than using a smart card or other device typically used to access cryptographic services. The scan partition 34 provides a key exchange and/or certification signature with the application in the requesting partition. The audit LSSP 18 may also be called to check the reliability of the cryptographic key, which is unique for each machine, and to authenticate the machine and the trusted software.

Those skilled in the art will also appreciate that the cryptographic services in scan partition 34 may also be called during an SSL setup. Also, more general cryptographic services may be provided in a service partition, such as the ability to host a cryptographic serviced partition (CSP).

Those skilled in the art also will appreciate that placing the root certificate keys in an isolated partition enforces separation of duties and prevents against a root key attack by not permitting the attacker to modify the root certificate keys.

Example 4

Trusted Compilation and Test

Figure 3:
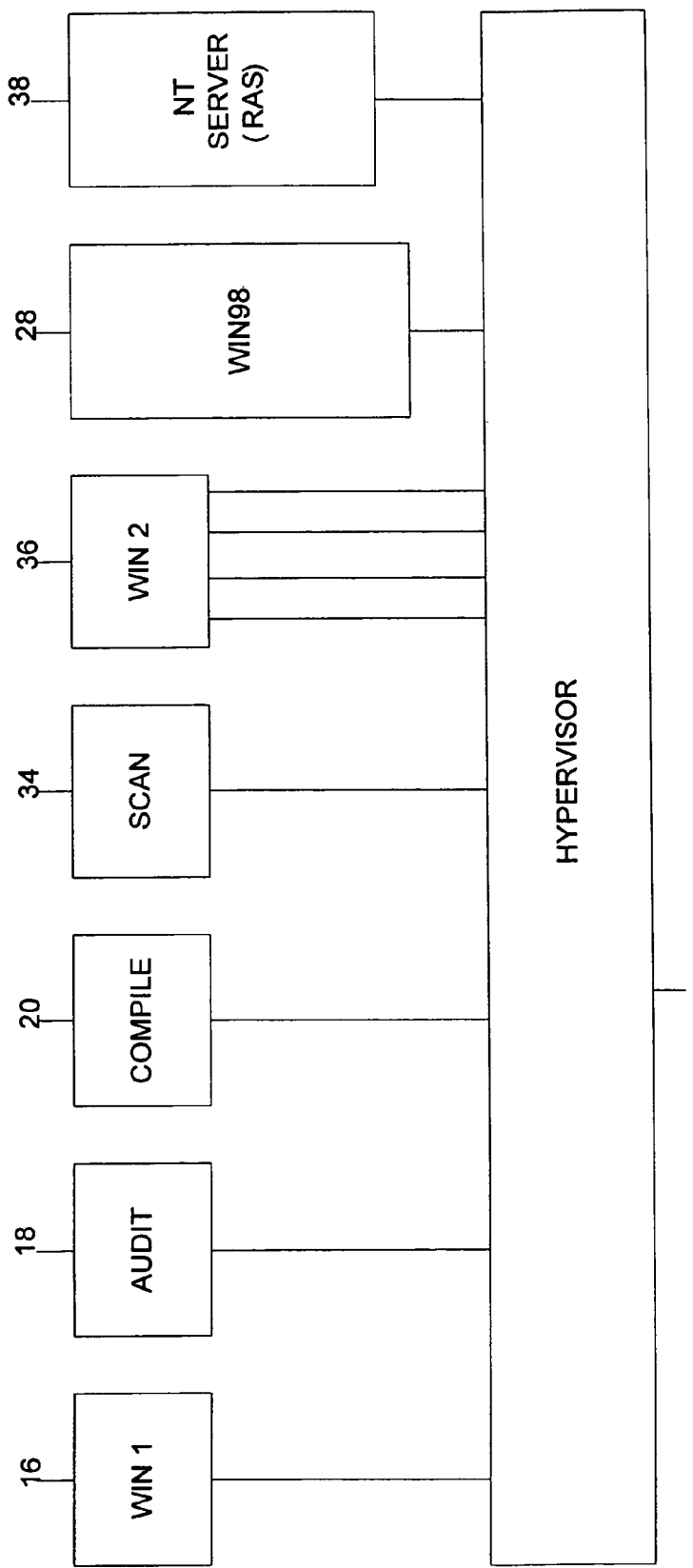
FIG. 3 illustrates how LSSPs may be configured to provide auditing and other security services to multiple operating systems operating within different partitions in a VM environment.

A partition in a VM system such as that in FIG. 3 can send a compile LSSP 20 a project to be built and tested. This can be done by the compile LSSP 20 read only mounting the SVBD containing the project. The hypervisor 12 will block any other partition (including the source partition) from mounting the SVBD while the compile LSSP 20 has the SVBD mounted. The compile LSSP 20 certifies the built project using an attestation identity key (AIK) slaved off the AIK of the TPM 14. Trusted JIT compilation for the CLR/Java is an example of such a process. The JITter is hosted in the compile LSSP 20 and a new manifest that names the jitted code is generated using a quote function that provides the identification of the measuring parts of the hypervisor 12 as stated in the TPM 14.

The compile LSSP 20 provides the ability to track the path through the software to identify the software and hardware that has been used and proof of who is using the processes (attestation). In the example of FIG. 3, the LSSP AIK is used to certify the newly jitted code.

Example 5

Protected Logon

In the case that sign-on across all partitions is to be shared, the functionality provided by a local security authority (LSA) such as the Windows LSA can be remoted into an LSSP, such as scan LSSP 34, to enable a single sign-on for shared access across multiple partitions. In this case, the remoted LSA could set the security context of the logged on user to reflect the target partition that the user is logging into. By remoting the LSA into a single partition, all other partitions may use stubs that make a RPC to the LSA to access the security functionality of the LSA. Moving the LSA secrets database into the scan LSSP 34 also protects the LSA secrets database from attacks by administratively privileged subjects in each (non-LSSP) partition. For example, a count database may be used to compare the user's log on credentials and to assign a security token to the log on process. In this case, plug-in interfaces will need to be remoted. Finally, centralizing the LSA allows for the setting of consistent security policy across partitions. Even in the case of a single partition, remoting the LSA provides security benefit, since the LSA is now protected against malicious code in the target partition.

Those skilled in the art will appreciate that the LSSPs of the invention may be used to provide a variety of services in a VM setting. For example, an LSSP in accordance with the invention may include a Windows composition such as a Windows manager, an X server, firewall services, network stack and other file system services that are put in part of a network stack, including a sound stack (mixer) and a telephony/VOIP stack. The LSSP also may implement a router in charge of the firewall and provide an access control code to provide security reference to a security monitor. In each case, RPC interfaces may be exposed for the implementation and/or an IP stack may be provided to provide easy to move IP services.

Exemplary Networked and Distributed Environments

One of ordinary skill in the art can appreciate that the invention can be implemented in connection with any suitable host computer or other client or server device, which can be deployed as part of a computer network, or in a distributed computing environment. In this regard, the invention pertains to any computer system or environment having any number of memory or storage units, and any number of applications and processes occurring across any number of storage units or volumes, which may be used in connection with virtualizing a guest OS in accordance with the invention. The invention may apply to an environment with server computers and client computers deployed in a network environment or distributed computing environment, having remote or local storage. The invention may also be applied to standalone computing devices, having programming language functionality, interpretation and execution capabilities for generating, receiving and transmitting information in connection with remote or local services.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes of the invention.

Figure 4A:
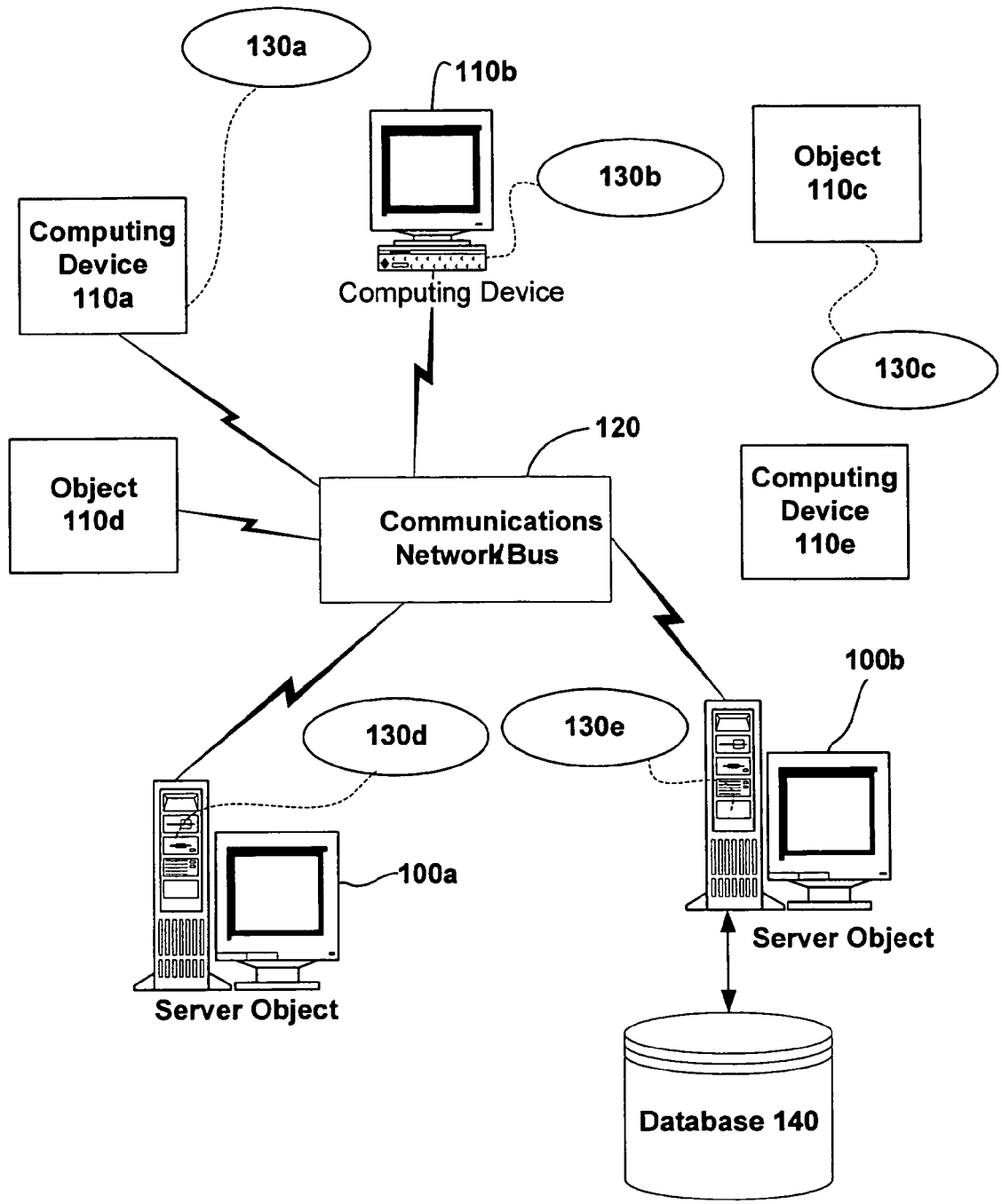
FIG. 4A is a block diagram representing an exemplary network environment having a variety of computing devices in which the invention may be implemented.

FIG. 4A provides a schematic diagram of an exemplary networked or distributed computing environment. The distributed computing environment comprises computing objects 100a, 100b, etc. and computing objects or devices 110a, 110b, 110c, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 120. This network may itself comprise other computing objects and computing devices that provide services to the system of FIG. 4A, and may itself represent multiple interconnected networks. In accordance with an aspect of the invention, each object 100a, 100b, etc. or 110a, 110b, 110c, etc. may contain an application that might make use of an API, or other object, software, firmware and/or hardware, to request use of the virtualization processes of the invention.

It can also be appreciated that an object, such as 110c, may be hosted on another computing device 100a, 100b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to the virtualization processes of the invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge as protocol standards may be interconnected to form a network, such as an intranet, that may be connected to the outside world by way of the Internet. In short, a variety of disparate sources exist for the storage and transmission of data, and consequently, moving forward, computing devices will require ways of sharing data, such as data accessed or utilized incident to program objects, which make use of the virtualized services in accordance with the invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 4A, computers 110a, 110b, etc. can be thought of as clients and computers 100a, 100b, etc. can be thought of as the server where server 100a, 100b, etc. maintains the data that is then replicated in the client computers 110a, 110b, etc., although any computer can be considered a client, a server, or both, depending on the circumstances. Any of these computing devices may be processing data or requesting services or tasks that may implicate an implementation of the architectures of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to making use of the virtualized architecture(s) of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

FIG. 4A illustrates an exemplary networked or distributed environment, with a server in communication with client computers via a network/bus, in which the invention may be employed. In more detail, a number of servers 100a, 100b, etc., are interconnected via a communications network/bus 120, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like. It is thus contemplated that the invention may apply to any computing device in connection with which it is desirable to implement guest interfaces and operating systems in accordance with the invention.

In a network environment in which the communications network/bus 120 is the Internet, for example, the servers 100a, 100b, etc. can be Web servers with which the clients 110a, 110b, 110c, 110d, 110e, etc. communicate via any of a number of known protocols such as HTTP. Servers 100a, 100b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 120, and may have independent communications associated therewith. For example, in the case of a TV or VCR, there may or may not be a networked aspect to the control thereof. Each client computer 110a, 110b, 110c, 110d, 110e, etc. and server computer 100a, 100b, etc. may be equipped with various application program modules or objects 130 and with connections or access to various types of storage elements or objects, across which files or data streams may be stored or to which portion(s) of files or data streams may be downloaded, transmitted or migrated. Any one or more of computers 100a, 100b, 110a, 110b, etc. may be responsible for the maintenance and updating of a database 140 or other storage element, such as a database or memory 140 for storing data processed according to the invention. Thus, the invention can be utilized in a computer network environment having client computers 110a, 110b, etc. that can access and interact with a computer network/bus 120 and server computers 100a, 100b, etc. that may interact with client computers 110a, 110b, etc. and other like devices, and databases 140.

Exemplary Computing Device

Figure 4B:
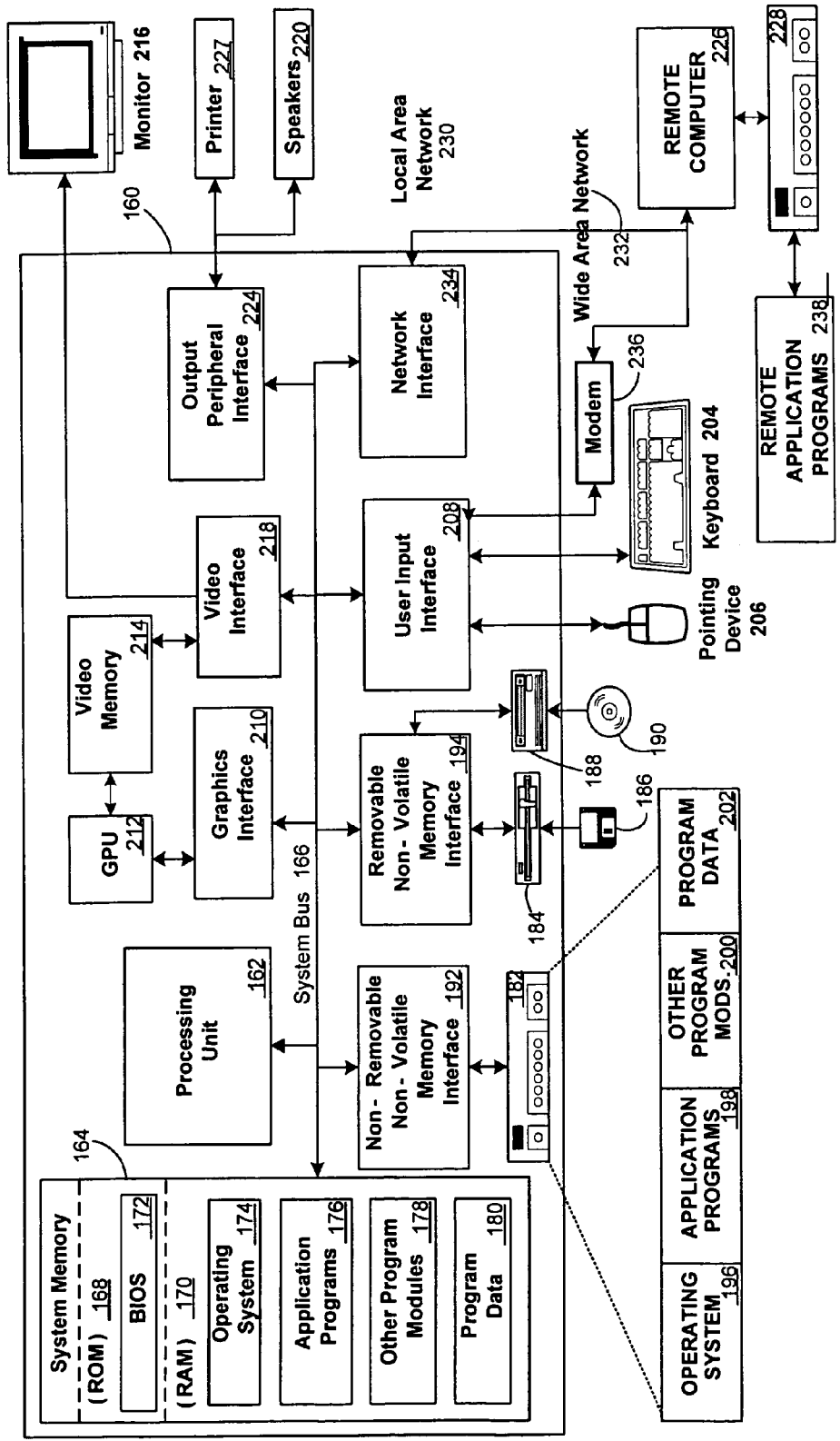
FIG. 4B is a block diagram representing an exemplary non-limiting host computing device in which the invention may be implemented.

FIG. 4B and the following discussion are intended to provide a brief general description of a suitable host computing environment in connection with which the invention may be implemented. It should be understood, however, that handheld, portable and other computing devices and computing objects of all kinds are contemplated for use in connection with the invention. While a general purpose computer is described below, this is but one example, and the invention may be implemented with a thin client having network/bus interoperability and interaction. Thus, the invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the virtualization techniques in accordance with the invention.

Although not required, the invention can be implemented in whole or in part via an operating system, for use by a developer of services for a device or object, and/or included within application software that operates in connection with the virtualized OS of the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. As noted above, the invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 4B illustrates an example of a suitable host computing system environment 150 in which the invention may be implemented, although as made clear above, the host computing system environment 150 is only one example of a suitable computing environment and is not intended to suggest any limitation as to the scope of use or functionality of the invention. Neither should the computing environment 150 be interpreted as having any dependency or requirement relating to any one or combination of components illustrated in the exemplary operating environment 150.

With reference to FIG. 4B, an exemplary system for implementing the invention includes a general purpose computing device in the form of a computer 160. Components of computer 160 may include, but are not limited to, a processing unit 162, a system memory 164, and a system bus 166 that couples various system components including the system memory to the processing unit 162. The system bus 166 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), and PCI Express (PCIe).

Computer 160 typically includes a variety of computer readable media. Computer readable media can be any available media that can be accessed by computer 160 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 160. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 164 includes computer storage media in the form of volatile and/or nonvolatile memory such as read only memory (ROM) 168 and random access memory (RAM) 170. A basic input/output system 172 (BIOS), containing the basic routines that help to transfer information between elements within computer 160, such as during start-up, is typically stored in ROM 168. RAM 170 typically contains data and/or program modules that are immediately accessible to and/or presently being operated on by processing unit 162. By way of example, and not limitation, FIG. 4B illustrates operating system 174, application programs 176, other program modules 178, and program data 180.

The computer 160 may also include other removable/non-removable, volatile/nonvolatile computer storage media. By way of example only, FIG. 4B illustrates a hard disk drive 182 that reads from or writes to non-removable, nonvolatile magnetic media, a magnetic disk drive 184 that reads from or writes to a removable, nonvolatile magnetic disk 186, and an optical disk drive 188 that reads from or writes to a removable, nonvolatile optical disk 190, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 182 is typically connected to the system bus 166 through a non-removable memory interface such as interface 192, and magnetic disk drive 184 and optical disk drive 188 are typically connected to the system bus 166 by a removable memory interface, such as interface 194.

The drives and their associated computer storage media discussed above and illustrated in FIG. 4B provide storage of computer readable instructions, data structures, program modules and other data for the computer 160. In FIG. 4B, for example, hard disk drive 182 is illustrated as storing operating system 196, application programs 198, other program modules 200 and program data 202. Note that these components can either be the same as or different from operating system 174, application programs 176, other program modules 178 and program data 180. Operating system 196, application programs 198, other program modules 200 and program data 202 are given different numbers here to illustrate that, at a minimum, they are different copies. A user may enter commands and information into the computer 160 through input devices such as a keyboard 204 and pointing device 206, commonly referred to as a mouse, trackball or touch pad. Other input devices (not shown) may include a microphone, joystick, game pad, satellite dish, scanner, or the like. These and other input devices are often connected to the processing unit 162 through a user input interface 208 that is coupled to the system bus 166, but may be connected by other interface and bus structures, such as a parallel port, game port or a universal serial bus (USB). These are the kinds of structures that are virtualized by the architectures of the invention. A graphics interface 210, such as one of the interfaces implemented by the Northbridge, may also be connected to the system bus 166. Northbridge is a chipset that communicates with the CPU, or host processing unit 162, and assumes responsibility for communications such as PCI, PCIe and accelerated graphics port (AGP) communications. One or more graphics processing units (GPUs) 212 may communicate with graphics interface 210. In this regard, GPUs 212 generally include on-chip memory storage, such as register storage and GPUs 212 communicate with a video memory 214. GPUs 212, however, are but one example of a coprocessor and thus a variety of coprocessing devices may be included in computer 160, and may include a variety of procedural shaders, such as pixel and vertex shaders. A monitor 216 or other type of display device is also connected to the system bus 166 via an interface, such as a video interface 218, which may in turn communicate with video memory 214. In addition to monitor 216, computers may also include other peripheral output devices such as speakers 220 and printer 222, which may be connected through an output peripheral interface 224.

The computer 160 may operate in a networked or distributed environment using logical connections to one or more remote computers, such as a remote computer 226. The remote computer 226 may be a personal computer, a server, a router, a network PC, a peer device or other common network node, and typically includes many or all of the elements described above relative to the computer 160, although only a memory storage device 228 has been illustrated in FIG. 4B. The logical connections depicted in FIG. 4B include a local area network (LAN) 230 and a wide area network (WAN) 232, but may also include other networks/buses. Such networking environments are commonplace in homes, offices, enterprise-wide computer networks, intranets and the Internet.

When used in a LAN networking environment, the computer 160 is connected to the LAN 230 through a network interface or adapter 234. When used in a WAN networking environment, the computer 160 typically includes a modem 236 or other means for establishing communications over the WAN 232, such as the Internet. The modem 236, which may be internal or external, may be connected to the system bus 166 via the user input interface 208, or other appropriate mechanism. In a networked environment, program modules depicted relative to the computer 160, or portions thereof, may be stored in the remote memory storage device. By way of example, and not limitation, FIG. 4B illustrates remote application programs 238 as residing on memory device 228. It will be appreciated that the network connections shown are exemplary and other means of establishing a communications link between the computers may be used.

There are multiple ways of implementing the invention, e.g., an appropriate API, tool kit, driver code, operating system, control, standalone or downloadable software object, etc. which enables applications and services to use the virtualized architecture(s), systems and methods of the invention. The invention contemplates the use of the invention from the standpoint of an API (or other software object), as well as from a software or hardware object that receives any of the aforementioned techniques in accordance with the invention. Thus, various implementations of the invention described herein may have aspects that are wholly in hardware, partly in hardware and partly in software, as well as in software.

As mentioned above, while exemplary embodiments of the invention have been described in connection with various computing devices and network architectures, the underlying concepts may be applied to any computing device or system in which it is desirable to emulate guest software. For instance, the various algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the virtualization techniques of the invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the invention. Additionally, any storage techniques used in connection with the invention may invariably be a combination of hardware and software.

While the invention has been described in connection with the preferred embodiments of the various figures, it is to be understood that other similar embodiments may be used or modifications and additions may be made to the described embodiment for performing the same function of the invention without deviating therefrom. For example, while exemplary network environments of the invention are described in the context of a networked environment, such as a peer to peer networked environment, one skilled in the art will recognize that the invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the invention in the context of a guest OS virtualized on a host OS, the invention is not so limited, but rather may be implemented to virtualize a second specialized processing unit cooperating with a main processor for other reasons as well. Moreover, the invention contemplates the scenario wherein multiple instances of the same version or release of an OS are operating in separate virtual machines according to the invention. It can be appreciated that the virtualization of the invention is independent of the operations for which the guest OS is used. It is also intended that the invention applies to all computer architectures, not just the Windows architecture. Still further, the invention may be implemented in or across a plurality of processing chips or devices, and storage may similarly be effected across a plurality of devices. Also, the invention may provide generalized "health monitoring" of one guest by another to decide whether to grant access to the network, decide whether to boot, provide run-time monitoring, and the like. Therefore, the invention should not be limited to any single embodiment, but rather should be construed in breadth and scope in accordance with the appended claims.

What is claimed:

1. A method providing a security service in a virtualized computer system, comprising:
   Providing by a hardware processor, a security service application in a first operating system running in a first partition of a virtualized computer system;
   Receiving by a hardware processor, a request from an application program for a security service, wherein the application program is running in a second operating system in a second partition of the virtualized computer system, the first partition being separate from the second partition;
   Providing by a hardware processor, by the security service application in the first partition, the security service in response to receiving the request from the application program, the first partition configured to certify the results of the security service performed by the security application program in the first partition.

2. A method as in claim 1, the first partition configured to certify the results of the security service performed by the security application program in the first partition using a key that identifies the first partition, and the key being an attestation identification key provided by a trusted program module.

3. A method as in claim 1, further comprising:
   storing an audit record of the provided security service in an audit log maintained in the first partition.

4. A method as in claim 3, further comprising:
   preventing, by a hypervisor of the virtualized computer system, a partition without rights to the audit log from accessing the audit log maintained in the first partition.

5. A method as in claim 1, the security service comprising a secure boot service, and the providing the security service comprising:
   booting the second partition off a secure virtual block device stored in the first partition, the secure virtual block device having encryption keys stored in a trusted computing base of the virtualized computer system; and
   scanning, by the secure virtual block device, a virtual boot disk between boot instantiations.

6. A method as in claim 5, further comprising:
   creating an exception state for the scanned virtual boot disk when the status of the scanned virtual boot disk may not be verified.

7. A method as in claim 1, the security service comprising a cryptographic service, and the method further comprising:
storing and managing root certificate keys for the second partition in the first partition.

8. A method as in claim 1, the security service comprising a trusted compilation and test service, and the method further comprising:
building and testing, in the first partition, a project using an attestation identity key slaved off of the an attestation identity key of a trusted program module to certify the project.

9. A method as in claim 1, wherein the security service comprises a local security authority, and wherein the method further comprises:
setting, by the local security authority, a security context of a logged on user to reflect a target partition of the virtualized computer system that the user is logging into.

10. A method as in claim 1, further comprising:
measuring the integrity of the first partition.

11. A method as in claim 1, further comprising:
granting or denying access, by the second partition, to a network based on a report of the first partition.

12. A virtual machine system comprising:
a hardware processor and a memory;
a security service application provided in a first operating system of a first partition of the virtual machine system; and
an application program running in a second operating system of a second partition of the virtual machine system, the first partition being separate from the second partition, wherein the application program is configured to send a request for a security service;
the security service application configured to provide the security service in the first partition in response to receiving a request from the application program, and the first partition configured to certify the results of the security service performed by the security service application in the first partition.

13. A system as in claim 12, further comprising a trusted program module configured to provide an attestation identification key, the first partition configured to use the attestation identification key to sign a trusted key that identifies the first partition, the attestation identification key identifying the first partition.

14. A system as in claim 12, further comprising an audit log server, wherein the security service application is configured to write audit records of the application.

15. A system as in claim 14, further comprising a hypervisor configured to prevent a partition without rights to the audit log server from accessing the audit records stored in the audit log server.

16. A system as in claim 13, the security service comprising a secure boot service, the second partition configured to boot off a secure virtual block device stored in the second partition, the secure virtual block device having encryption keys stored in the trusted program module, and the secure block device configured to scan a virtual boot disk between boot instantiations.

17. A system as in claim 16, the first partition configured to create an exception state for the scanned virtual boot disk when the status of the scanned virtual boot disk may not be verified.

18. A system as in claim 12, the security service comprising a cryptographic service, and the first partition configured to store and manage root certificate keys for the first partition.

19. A system as in claim 13, the security service comprising a trusted compilation and test service, the second partition configured to build and test a project using an attestation identity key slaved off of an attestation identity key of the trusted program module to certify the project.

20. A system as in claim 12, the security service comprising a local security authority configured to set a security context of a logged on user to reflect a target partition of the virtualized computer system that the user is logging into.

21. A device comprising:
a hardware processor;
a first partition comprising a first operating system and a security service application provided in the first operating system; and
a second partition comprising a second operating system and an application running in the second operating system, the first partition being separate from the second partition, wherein the application program is configured to send a request for a security service;
the security service application configured to provide the security service in the first partition in response to receiving a request by the application program, the first partition configured to certify the results of the security service performed by the security service application in the first partition.

22. A device as in claim 21, further comprising a trusted program module configured to provide an attestation identification key, the first partition configured to use the attestation identification key to sign a trusted key that identifies the first partition, the attestation identification key identifying the first partition.

* * * * *